(No Model.) 2 Sheets—Sheet 1.
J. HART.
Comb.
No. 241,211. Patented May 10, 1881.
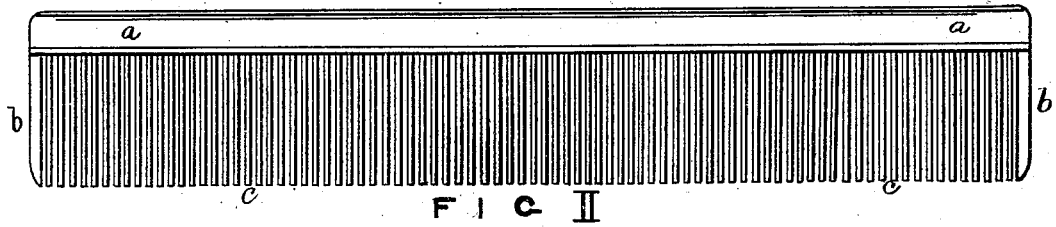
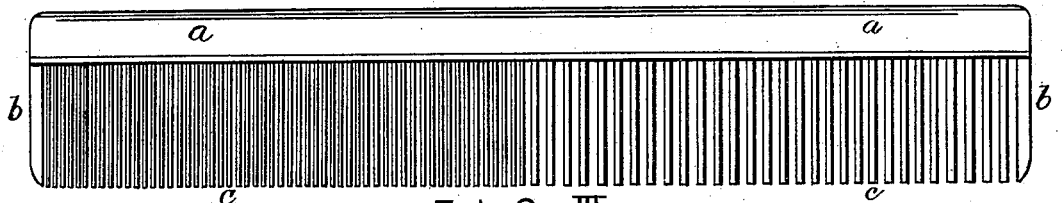
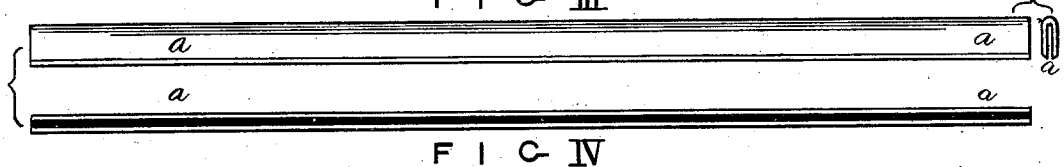
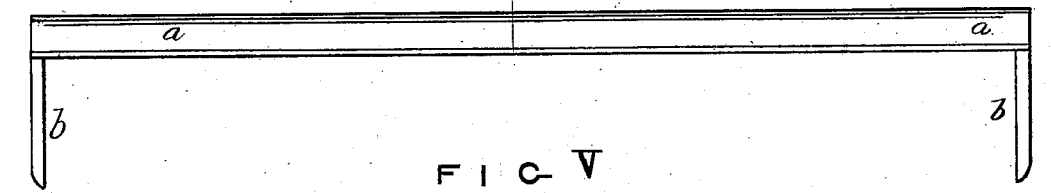
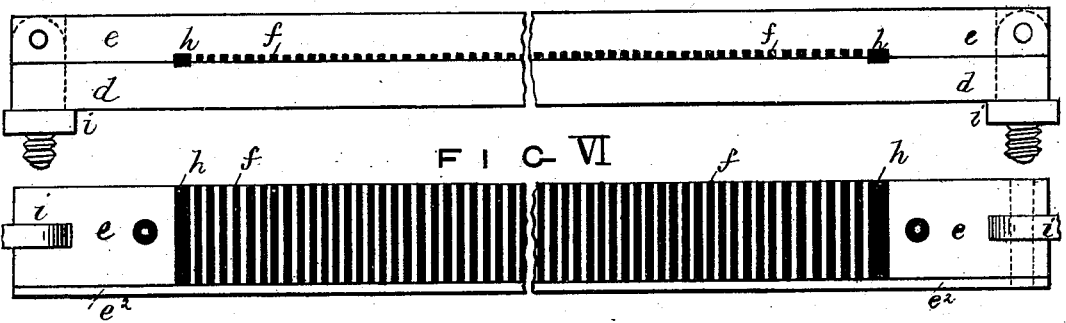
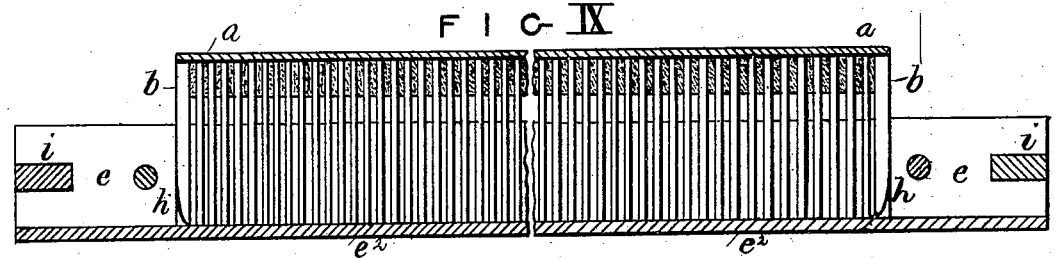
Witnesses
Richard Skerritt
Henry Skerritt
Inventor
Joseph Hart (No Model.) 2 Sheets—Sheet 2.
J. HART.
Comb.
No. 241,211. Patented May 10, 1881.
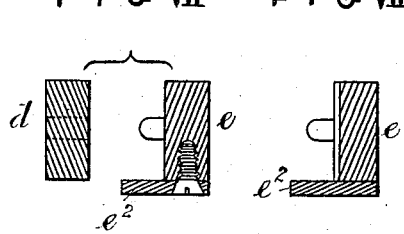
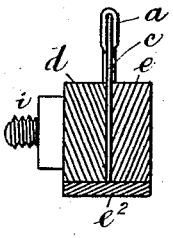
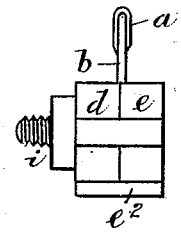
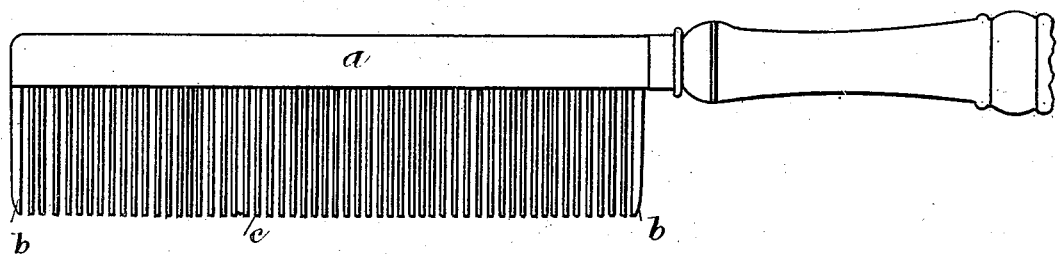
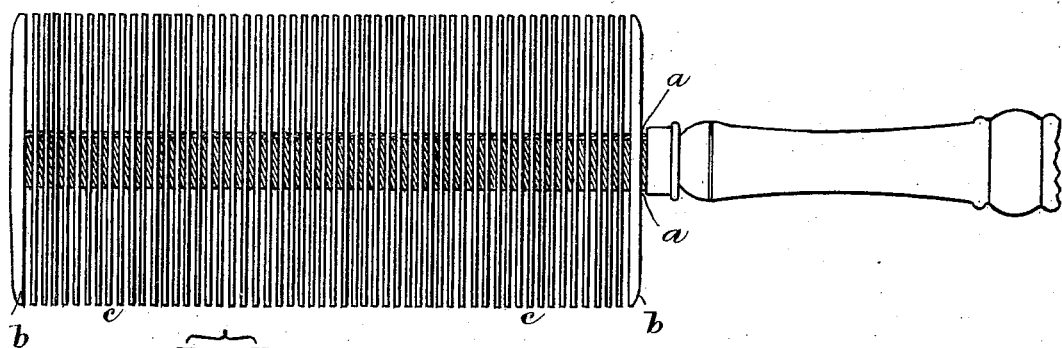
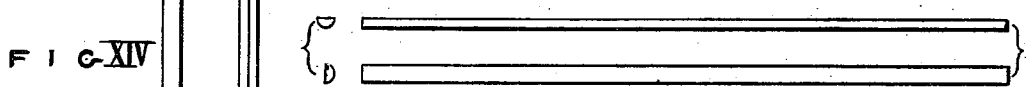
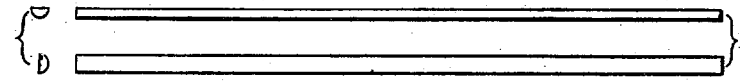
Witnesses
Richard Sherrett
Henry Sherrett
Inventor
Joseph Hart
N. PETERS, Photo-Lithographer, Washington, D. C.

UNITED STATES PATENT OFFICE.

JOSEPH HART, OF HANDSWORTH, COUNTY OF STAFFORD, ENGLAND.

COMB.

SPECIFICATION forming part of Letters Patent No. 241,211, dated May 10, 1881.

Application filed July 19, 1880. (No model.) Patented in England November 8, 1879.

*To all whom it may concern:*

Be it known that I, JOSEPH HART, a subject of the Queen of Great Britain, residing at Handsworth, in the county of Stafford, England, dyer, have invented certain new and useful Improvements in Hand or Dressing Combs, (for which I have received Letters Patent in England, No. 4,558, dated November 8, 1879;) and I do hereby declare that the following is a full, clear, and exact description of the invention, which will enable others skilled in the art to which it appertains to make and use the same.

My invention consists of the improvements hereinafter described in constructing hand or dressing combs such as are used for combing the human hair or for combing horses and other animals.

Instead of making the backs or bodies and the teeth of the said combs in one piece, as usual, I make the teeth of the combs separate from the backs or bodies, and construct the said backs or bodies and connect the teeth thereto in the manner hereinafter described.

According to one of my improvements I make the teeth of the comb of lengths or pieces of wire made in any convenient way, and having, by preference, rounded points. The metallic teeth may either be made of straight lengths of wire or of bent or doubled lengths of wire, each doubled wire forming one or more teeth. These wires, when made of steel, may be magnetized, the straight wires forming, when secured in the back or body of the comb, a set of small bar-magnets, and the bent or doubled wires forming a series of horseshoe-magnets extending through the whole length of the comb.

I make the backs or bodies of the combs and secure the loose teeth therein in the following manner: I make the backs or bodies either of metal, wood, vulcanite, papier-maché, or other strong and durable material, and either of one or more pieces.

In making the backs or bodies of metal, I take a piece of open-jointed tubing or trough-piece having an elliptical, flat, or other figure in cross-section, and in the open joint of the tubing or trough I place the ends of the wires to form the teeth of the comb, the said wires, arranged at the required distances apart, being held in a suitable holder or clamp. The teeth are then secured in the tubular back or body by soldering or by filling the tubular back or body with a composition or cement. The ends of the loose metallic teeth are thereby either soldered to the tubular back or body or are embedded in the composition or cement, and are thereby securely fixed in the said back or body.

Instead of forming the backs or bodies of the combs of open jointed tubing, tubes with a closed joint may be used. In this case holes are drilled in the tubes for the passage of the teeth into them. Or the backs or bodies may be made of two or more parts formed by stamping or otherwise, the said parts being secured together by soldering or riveting, or by clips; or the backs or bodies, made of a metallic or non-metallic material, may be cast upon the loose teeth, which I prefer in this case to be headed.

Double combs—that is, combs having teeth on each side of the back—may be made according to my invention. In this case metallic teeth, either of single or double wires, are inserted in and through the backs and fastened, as before described. The teeth may be made of hollow or tubular wire instead of solid wire.

I will now proceed to describe, with reference to the accompanying drawings, the manner in which my invention may be performed.

Figures I and II represent side elevations of hand or dressing combs made according to my invention, the comb Fig. I being formed with broad teeth, and the comb Fig. II being formed partly with broad teeth and partly with fine teeth. In the said Figs. I and II, *a* is the metallic back or body of the comb, *b b* are the guards at the ends of the back or body, and *c c* are the metallic teeth fastened in the said body. In the comb Fig. I, the back or body *a* is made narrower than the back or body of the comb Fig. II; but I do not limit myself to any particular width of the back or body.

Fig. III represents in side elevation, end elevation, and edge view the metallic back *a* of the comb Fig. I separately; and Fig. IV represents the said back after the guards or large end teeth, *b b*, have been fastened in it preparatory to the fastening of the teeth *c c* in the said back. The said metallic back or body *a* has a flat tubular figure, open at one edge, or the trough-like form, best seen in the end elevation, Fig. III. I make the said metallic back or body *a* by preference by stamping in dies; but it may be made by a drawing process or by casting; or the said back or body may be made from tubes having closed joints, the said tubes being either flat or oval or of other form in cross-section and punched or drilled with holes at one side for the passage of the teeth into the tubular back or body.

Fig. V represents in side elevation the clamp or holder which I use for arranging and holding the wires of which the teeth of the comb are made at the proper distances apart preparatory to the soldering or otherwise fastening of the said teeth in the metallic or other back or body.

Fig. VI represents the inner face of one part of the clamp or holder.

Fig. VII represents a cross-section of the two parts of the clamp or holder, and Fig. VIII represents a cross-section of one of the said parts.

Fig. IX represents in horizontal section a portion of the clamp or holder, exhibiting the manner in which the wires to form the teeth are arranged and held in the clamp, the said Fig. IX also showing the ends of the wires or teeth inserted in the tubular or trough-like back *a*, ready for the soldering or fixing operation.

Fig. X represents in cross-section and Fig. XI in end elevation the clamp with the teeth fixed in it, in combination with the metallic back or body *a* of the comb. The clamp represented is fitted for the arranging and fixing of the teeth for the manufacture of the comb represented in Fig. I. The said clamp or holder consists of two bars, *d* and *e*. The bar *d* is plain, but the bar *e* is grooved on its upper face, the grooves *f* being arranged at distances apart equal to the distances between the teeth of the comb to be made. The grooved bar *e* is furnished with a back plate, $e^2$, for supporting the plain bar *d*. The said plate $e^2$ also serves as a stop for the wires. Broad grooves *h h* are made near the ends of the two bars *d e* to receive the guards or broad teeth *b b* of the partly-made comb. To the ends of the grooved bar *e* clamping-screws and nuts, at *i*, are jointed, slots being made in the bars for the passage of the said clamping-screws.

In making the comb Fig. I, I take the trough or tubular back or body, Fig. III, and fix in its ends by soldering the guards or broad teeth *b b*. I next place in the grooves *f* of the bar *e* of the clamp or holder the lengths of wire to form the teeth of the comb, the ends of the said wires projecting from the edge of the clamp, as represented in Figs. IX, X, and XI. The clamping-bar *d* being placed upon the grooved bar *e*, the two bars *d e* are clamped or bound firmly together by the clamping screws and nuts at *i*, as represented in Figs. X and XI. The said wires are thereby fixed in the clamp at equidistances apart. Granulated solder or solder in strips having been placed in the trough or tubular back *a* of the comb, Fig. IV, the guards *b b* of the said back are passed into the broad grooves *h h* at the ends of the clamp, in the manner represented in Fig. IX, the projecting ends of the teeth passing into the trough or tubular bar *a*. By now heating the back *a*, by means of a blow-pipe flame or other source of heat, the solder in the said back is fused and the ends of the teeth are soldered to the said back. After the solder has set or cooled the two parts of the clamp are separated and the comb may be removed and finished in any desired way. When the teeth of the comb are to be fastened in the back by means of a fusible cement or composition, the said cement or composition in a fused state is poured in the back immediately before the latter is passed onto the projecting ends of the wires fixed in the clamp or holder. The composition or cement which may be used for the purpose described consists, essentially, of resin or bitumen mixed with some hard-setting material, such as plaster-of-paris; but any other hard-setting cement or material may be used.

Fig. XII represents a comb provided with a handle made according to my invention.

Fig. XIII represents in section a double comb—that is, a comb having teeth on each side of the back—made according to my invention. In this arrangement the guides *b b* and wires *c c*, of which the teeth are formed, are nearly double the length of those used for single combs, and the trough or tubular back is perforated or pierced at its closed edge for the passage through it of the guards *b b* and wires or teeth *c c*. The teeth of the double comb are fastened in the back or body *a* by soldering or by a cement or composition, as before described. When the back of the double comb is made of a closed tube it is perforated at both edges.

The teeth *c* of the comb may be made of doubled lengths of wire, as represented drawn to a larger scale in Figs. XIV and XV, Fig. XV representing the wire before it is doubled and Fig. XIV after it has been doubled. The wire I use is semicircular in cross-section. When the piece of wire is doubled or folded a rounded end is formed at the fold, and the flat faces of the semicircular wire abut against one another. Or, instead of making each tooth of a single length of wire folded or unfolded, as before described, the whole or several teeth of the comb may be made of a single length of wire. In this case the wire is doubled or bent into a series of zigzag parallel folds, so as to form a set of teeth arranged side by side, each tooth being joined at its base to the teeth on either side of it. This method of manufacturing the teeth from a single piece of wire is represented in Fig. XVI.

Although I prefer to make the metallic backs of the combs of a single piece of sheet metal, yet they may be made of two pieces joined together by soldering or riveting or otherwise. When I make the backs by casting and attach the metallic teeth to the back by the casting process, I place the teeth in the mold and cast the metallic or non-metallic back upon the said teeth. When separate non-metallic backs are used the teeth are fixed in the backs by a cement or composition, and, if necessary, the backs may be compressed during the setting of the cement or composition.

Having now described the nature of my invention and the manner in which the same is to be performed, I wish it to be understood that I claim as my invention—

1. The described clamp, consisting of two bars, one grooved and the other plain, a back plate, and clamping devices, substantially as described.

2. The method of forming the comb having the teeth and back in different pieces by fixing to the back the guards or large end teeth, placing the intermediate teeth in a suitable holder or clamp provided with holes for receiving the guards, and then uniting the back to the intermediate teeth, substantially as described.

3. A double comb having wire teeth secured at the middle to a back by solder or cement and spaced, substantially as described.

4. In a comb, circular teeth formed of semicircular wire doubled upon itself and pressed together, substantially as described.

5. A comb having a number of teeth formed on a single wire doubled on itself and united to a back, substantially as described.

JOSEPH HART. [L. S.]

Witnesses:
RICHARD SKERRETT,
HENRY SKERRETT,
*Both of No. 37 Temple Street, Birmingham.*